(12) United States Patent
Lim et al.

(10) Patent No.: US 9,264,079 B2
(45) Date of Patent: Feb. 16, 2016

(54) APPARATUS AND METHOD FOR DC OFFSET CALIBRATION IN SIGNAL TRANSMISSION DEVICE

(71) Applicant: Samsung Electronics Co., Ltd., Suwon-si, Gyeonggi-do (KR)

(72) Inventors: Jae-Hyun Lim, Seoul (KR); Young-Taek Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 14/104,440

(22) Filed: Dec. 12, 2013

(65) Prior Publication Data

US 2014/0161208 A1    Jun. 12, 2014

(30) Foreign Application Priority Data

Dec. 12, 2012 (KR) .................. 10-2012-0144365

(51) Int. Cl.
*H04B 17/00* (2015.01)
*H04B 1/04* (2006.01)

(52) U.S. Cl.
CPC .................. *H04B 1/0475* (2013.01)

(58) Field of Classification Search
CPC .................................................. H04B 1/0475

USPC ............. 455/115.1, 114.1, 114.2, 63.1, 296, 455/67.11
See application file for complete search history.

(56) References Cited

U.S. PATENT DOCUMENTS 7,603,084 B2 * 10/2009 Aytur ........................... 455/63.1
2009/0212983 A1 * 8/2009 Fukuzawa et al. ............. 341/142

* cited by examiner

*Primary Examiner* — Sanh Phu
(74) *Attorney, Agent, or Firm* — Jefferson IP Law, LLP

(57) ABSTRACT

An apparatus and a method for Direct Current (DC) offset calibration in a signal transmission device of a wireless communication system are provided. The apparatus includes a first DC calibration unit for removing a DC offset from a signal, which is output from a Current-to-Voltage Converter (IVC), by using a first DC calibration value, a Variable Gain Amplifier (VGA) for amplifying the signal output from the IVC, a second DC calibration unit for removing a DC offset from a signal output from the VGA by using a second DC calibration value, a Low Pass Filter (LPF) for filtering the signal output from the VGA, a third DC calibration unit for removing a DC offset from a signal output from the LPF by using a third DC calibration value, and a controller for determining the first DC calibration value, the second DC calibration value and the third DC calibration value.

18 Claims, 4 Drawing Sheets

APPARATUS AND METHOD FOR DC OFFSET CALIBRATION IN SIGNAL TRANSMISSION DEVICE

PRIORITY

This application claims the benefit under 35 U.S.C. §119(a) of a Korean patent application filed on Dec. 12, 2012 in the Korean Intellectual Property Office and assigned Serial No. 10-2012-0144365, the entire disclosure of which is hereby incorporated by reference.

BACKGROUND OF THE INVENTION

1. Field of the Invention

The present invention relates to an apparatus and a method for Direct Current (DC) offset calibration in a signal transmission device of a wireless communication system.

2. Description of the Related Art

Generally, in a wireless communication environment, a Complementary Metal-Oxide Semiconductor (CMOS) Radio Frequency Integrated Circuit (RFIC) serves to transmit a baseband modem signal using a radio wave, and serves to deliver a reception signal received through an antenna to a Modulator/Demodulator (MODEM) without distortion.

A 4th generation wireless communication standard, such as Long Term Evolution (LTE) or Mobile WiMax, uses a modulation scheme, such as a 16 Quadrature Amplitude Modulation (16QAM) scheme or a 64QAM scheme, in order to transmit and receive a relatively large amount of data without distortion. The use of this modulation scheme indicates that an Error Vector Magnitude (EVM) performance corresponding to a quality index of a signal transmitted by a signal transmission device must be good.

Major factors which affect EVM performance include the linearity of an output-side circuit, the phase noise of a Local Oscillator (LO) signal, the amount of imbalance of an In-phase/Quadrature (IQ) channel, the amount of LO leakage (for example, a DC offset), etc. Particularly, LO leakage is generated by a DC offset of an analog baseband signal which is input to a mixer, and must be minimized in order to improve the EVM performance. Moreover, if the amount of LO leakage increases, even when a signal reception device demodulates a signal transmitted by the signal transmission device, the EVM performance is degraded.

In order to efficiently operate a wireless communication network, the signal transmission device has a dynamic range of 70 to 80 dB, and 30 to 40 dB within the dynamic range of 70 to 80 dB is determined as a dynamic range of an analog baseband. Accordingly, in order to meet the specifications of LO leakage in the entire range of an output voltage (output power), a DC offset must be removed for each gain step in the analog baseband.

FIG. 1 is a block diagram schematically showing an internal configuration of a signal transmission device in a wireless communication system according to the related art.

Referring to FIG. 1, the signal transmission device may include a Digital-to-Analog Converter (DAC) 111, a Current-to-Voltage Converter (IVC) 113, a Variable Gain Amplifier (VGA) 115, a Low Pass Filter (LPF) 117, a DC calibration unit 119, a mixer 121, a Local Oscillator (LO) 123, and a drive amplifier 125.

The DAC 111, which is typically part of a MODEM, first converts an I (in-phase) signal and a Q (quadrature) signal into an analog signal, and outputs the converted analog signal to the IVC 113. The IVC 113 converts the converted analog baseband signal, which is output from the MODEM, into a voltage signal, and the converted voltage signal to the VGA 115.

The VGA 115 amplifies the signal, which is output from the IVC 113, by a previously-set gain, and a signal from the VGA 115 is output to the LPF 117. At this time, the DC calibration unit 119 first removes a DC offset from the signal, which is output from the VGA 115, by using a DC calibration value determined according to the control of the controller, and outputs a signal, which is obtained by removing the DC offset, to the LPF 117. The LPF 117 filters a signal obtained after the DC calibration unit 119 removes the DC offset in such a manner as to limit a bandwidth of the signal to a previously-set bandwidth, and outputs the filtered signal to the mixer 121.

The mixer 121 mixes the signal, which is obtained after the DC calibration unit 119 removes the DC offset, with a signal, which is output from the LO 123, and outputs a mixed signal to the drive amplifier 125. The drive amplifier 125 amplifies the signal, which is output from the mixer 121, by a previously-set gain, and outputs an amplified signal.

As described above, a DC calibration value used by the typical DC calibration unit 119 is a value used to remove a DC offset in the entire analog baseband with respect to a particular gain. Accordingly, when gains used by the VGA 115 and the LPF 117 change, a DC offset is again generated.

Therefore, a need exists for an apparatus and method for DC offset calibration in a signal transmission device of a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for Direct Current (DC) offset calibration in a signal transmission device of a wireless communication system.

In accordance with an aspect of the present invention, a method for DC offset calibration in a signal transmission device is provided. The method includes converting a signal, into a voltage signal by a Current-to-Voltage Converter (IVC), removing a DC offset from a signal, which is output from the IVC, by using a first DC calibration value by a first DC calibration unit, amplifying the signal output from the IVC by using a previously-set gain by a Variable Gain Amplifier (VGA), removing a DC offset from a signal, which is output from the VGA, by using a second DC calibration value by a second DC calibration unit, filtering the signal output from the VGA in such a manner as to limit a bandwidth of the signal to a previously-set bandwidth, by a Low Pass Filter (LPF), and removing a DC offset from a signal, which is output from the LPF, by using a third DC calibration value by a third DC calibration unit.

In accordance with another aspect of the present invention, an apparatus for DC offset calibration in a signal transmission device is provided. The apparatus includes an IVC for converting a signal, into a voltage signal, a first DC calibration unit for removing a DC offset from a signal, which is output from the IVC, by using a first DC calibration value, a VGA for amplifying the signal obtained output from the IVC by using a previously-set gain, a second DC calibration unit for removing a DC offset from a signal, which is output from the VGA, by using a second DC calibration value, an LPF for filtering the signal output from the VGA in such a manner as to limit a bandwidth of the signal to a previously-set bandwidth, a third DC calibration unit for removing a DC offset from a signal, which is output from the LPF, by using a third DC calibration value, and a controller for determining the first DC calibration value, the second DC calibration value and the third DC calibration value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and a method for Direct Current (DC) offset calibration in a signal transmission device of a wireless communication system.

Figure 2:
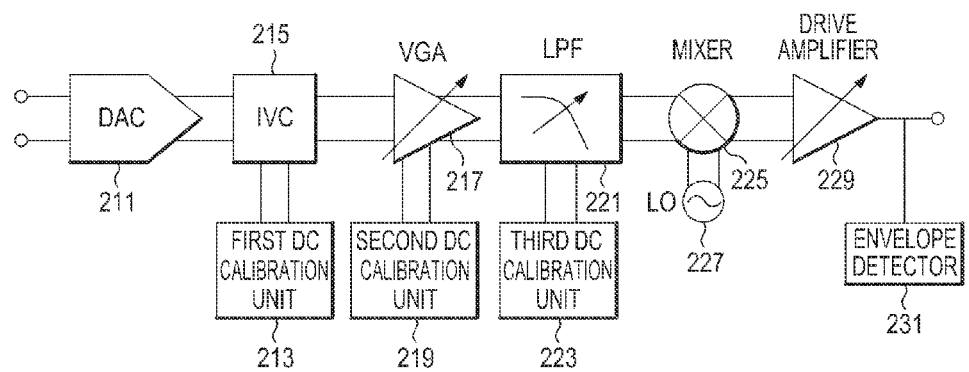
FIG. 2 is a block diagram schematically showing an internal configuration of a signal transmission device in a wireless communication system according to an exemplary embodiment of the present invention.

FIG. 2 is a block diagram schematically showing an internal configuration of a signal transmission device in a wireless communication system according to an exemplary embodiment of the present invention.

Referring to FIG. 2, the signal transmission device may include a Digital-to-Analog Converter (DAC) 211, a first DC calibration unit 213, a Current-to-Voltage Converter (IVC) 215, a Variable Gain Amplifier (VGA) 217, a second DC calibration unit 219, a Low Pass Filter (LPF) 221, a third DC calibration unit 223, a mixer 225, a Local Oscillator (LO) 227, a drive amplifier 229, an envelope detector 231, and a controller (not separately shown in FIG. 2).

The DAC 211 of a Modulator/Demodulator (MODEM) may convert an I (in-phase) signal and a Q (quadrature) signal into an analog baseband signal and output the converted signal to the IVC 215. The first DC calibration unit 213 may remove a DC offset from the converted analog baseband signal in the IVC 215, and the IVC 215 outputs a signal, which is obtained by removing the DC offset, to the VGA 217. The first DC calibration unit 213 can remove the DC offset by using a DC calibration value determined according to the control of the controller. An operation of the controller for determining a DC calibration value used by the first DC calibration unit 213 will be described in more detail below with reference to FIG. 3 and FIG. 4. Accordingly, a detailed description thereof will be omitted here. Meanwhile, the IVC 215 may convert a current signal, which is output from the DAC 211, into a voltage signal, and output the converted voltage signal to the VGA 217.

The VGA 217 may amplify the signal, which is output from the IVC 215, by a previously-set gain. The second DC calibration unit 219 may remove a DC offset from a signal, which is output from the VGA 217, and a signal obtained by removing the DC offset is output to the LPF 221. At this time, the second DC calibration unit 219 may remove the DC offset by using a DC calibration value determined according to the control of the controller. An operation of the controller for determining a DC calibration value used by the second DC calibration unit 219 will be described in more detail below with reference to FIG. 3 and FIG. 6. Accordingly, a detailed description thereof will be omitted here.

The LPF 221 may filter a signal obtained after the second DC calibration unit 219 removes the DC offset, in such a manner as to limit a bandwidth of the signal to a previously-set bandwidth. The third DC calibration unit 223 may remove a DC offset from a signal which is output from the LPF 221, and a signal obtained by removing the DC offset is output to the mixer 225. At this time, the third DC calibration unit 223 may remove a DC offset by using a DC calibration value determined according to the control of the controller. An operation of the controller for determining a DC calibration value used by the third DC calibration unit 223 will be described in more detail below with reference to FIG. 3 and FIG. 5. Accordingly, a detailed description thereof will be omitted here.

The mixer 225 may mix the signal, which is obtained after the third DC calibration unit 223 removes the DC offset, with a signal, which is output from the LO 227, and output a mixed signal to the drive amplifier 229. The drive amplifier 229 can amplify the signal, which is output from the mixer 225, by a previously-set gain, and output an amplified signal. At this time, the envelope detector 231 may measure the magnitude of an analog baseband input tone detected from an envelope of an RF signal, which is output from the drive amplifier 229, and output a result of the measurement to the controller.

The controller may track the magnitude of an analog baseband input tone, which is output from the envelope detector 231, and determine a DC calibration value used by each of the first DC calibration unit 213, the second DC calibration unit 219 and the third DC calibration unit 223. An operation of the controller for determining a DC calibration value which is to be used by each of the first DC calibration unit 213, the second DC calibration unit 219 and the third DC calibration unit 223 will be described in more detail below with reference to FIG. 3 to FIG. 6. Accordingly, a detailed description thereof will be omitted here.

Figure 3:
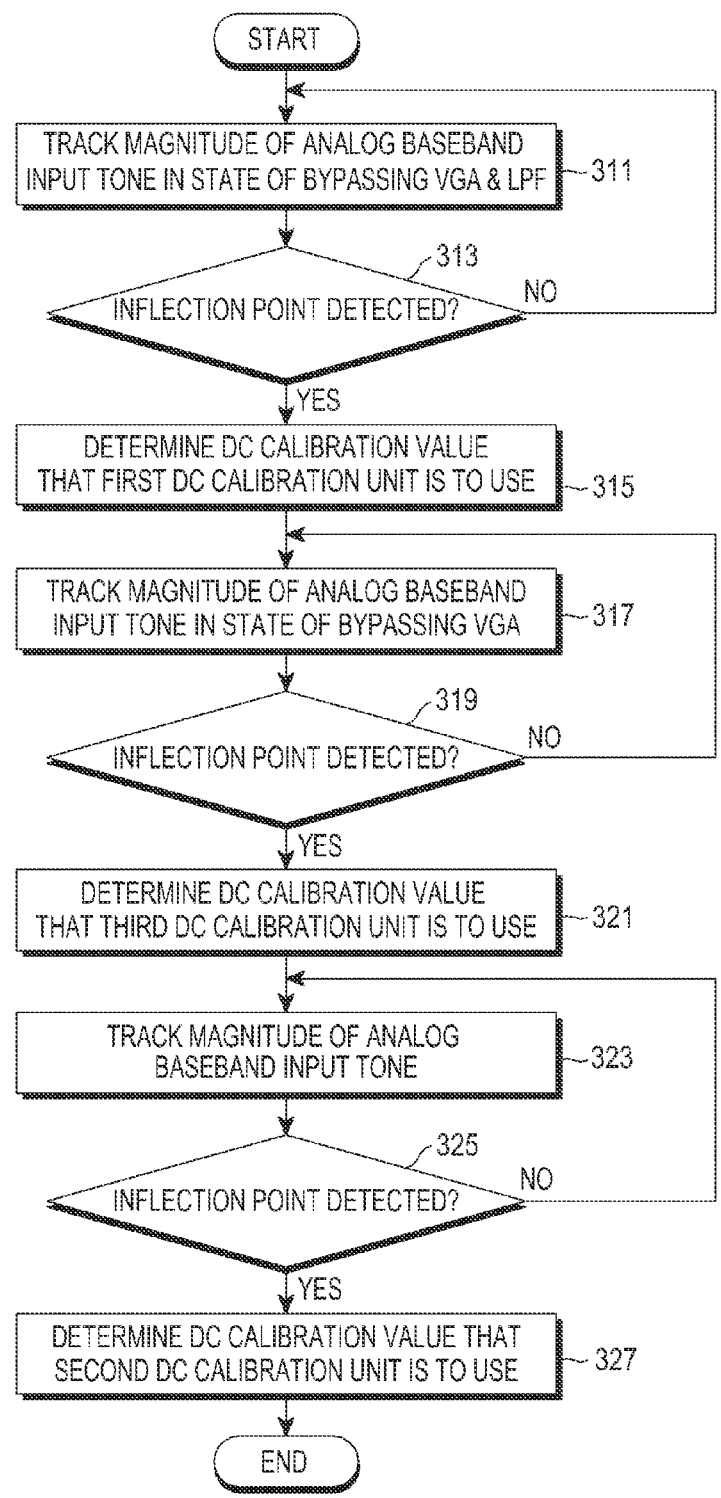
FIG. 3 is a flowchart showing an operation of determining a Direct Current (DC) calibration value for use in DC calibration according to an exemplary embodiment of the present invention.

FIG. 3 is a flowchart showing an operation of determining a DC calibration value for use in DC calibration unit according to an exemplary embodiment of the present invention.

Referring to FIG. 3, in step 311, in order to remove a DC offset from a signal which is output from the IVC 215, the controller may track the magnitude of an analog baseband input tone, which is output from the envelope detector 231. And the controller adjusts a DC calibration value of the first DC calibration unit 213 by a previously-set step value from a first default value, in a state of bypassing the VGA 217 and the LPF 221 in order to prevent a signal from being input/output to/from the VGA 217 and the LPF 221, and proceeds to step 313. In step 313, the controller may identify whether a point (namely, an inflection point) is detected at which the magnitude of an analog baseband input tone, which is output from the envelope detector 231, continuously decreases and again increases in step 313. When a result of the identification in step 313 shows that the inflection point is not detected, the controller returns to step 311.

When a result of the identification in step 313 shows that the inflection point is detected, the controller proceeds to step 315. In step 315, the controller may determine that a DC calibration value, at which the inflection point is detected, is a DC calibration value that the first DC calibration unit 213 is to use, and proceeds to step 317.

In step 317, in order to remove a DC offset from a signal which is output from the LPF 221, the controller tracks the magnitude of an analog baseband input tone, which is output from the envelope detector 231, while the controller adjusts a DC calibration value of the third DC calibration unit 223 by a previously-set step value from a first default value, in a state of bypassing the VGA 217 in order to prevent a signal from being input/output to/from the VGA 217. When the controller determines the DC calibration value that the third DC calibration unit 223 is to use, the first DC calibration unit 213 may use the DC calibration value determined in step 315.

In step 319, the controller identifies whether a point (namely, an inflection point) is detected at which the magnitude of an analog baseband input tone, which is output from the envelope detector 231, continuously decreases and again increases. When a result of the identification in step 319 shows that the inflection point is not detected, the controller may return to step 317

When a result of the identification in step 319 shows that the inflection point is detected, the controller proceeds to step 321. In step 321, the controller may determine that a DC calibration value, at which the inflection point is detected, is a DC calibration value that the third DC calibration unit 223 is to use, and proceeds to step 323.

In step 323, in order to remove a DC offset from a signal which is output from the VGA 217, the controller tracks the magnitude of an analog baseband input tone, which is output from the envelope detector 231. And, the controller adjusts a DC calibration value of the second DC calibration unit 219 by a previously-set step value from a first default value. At this time, when the controller may determine the DC calibration value that the second DC calibration unit 219 is to use, the first DC calibration unit 213 uses the DC calibration value determined in step 315, and the third DC calibration unit 223 uses the DC calibration value determined in step 321.

The controller may identify whether a point (namely, an inflection point) is detected at which the magnitude of an analog baseband input tone, which is output from the envelope detector 231, continuously decreases and again increases in step 325. When a result of the identification in step 325 shows that the inflection point is not detected, the controller returns to step 323.

When a result of the identification in step 325 shows that the inflection point is detected, the controller proceeds to step 327. The controller may determine that a DC calibration value, at which the inflection point is detected, is that the second DC calibration unit 219 is to use, and complete the steps in step 327.

In FIG. 3, a description was provided of an exemplary operation of the controller shown in FIG. 2 for determining a DC calibration value which is to be used by each of the first DC calibration unit 213, the second DC calibration unit 219 and the third DC calibration unit 223. Next, an exemplary process in which the controller shown in FIG. 2 controls the operation of the first DC calibration unit 213 and determines a first DC calibration value will be described with reference to FIG. 4.

Figure 4:
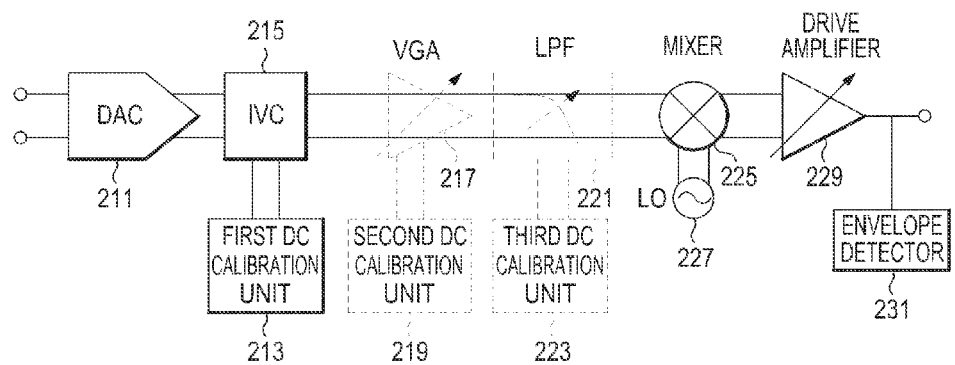
FIG. 4 is a view showing a process in which a controller controls the operation of a first DC calibration unit and determines a first DC calibration value according to an exemplary embodiment of the present invention.

FIG. 4 is a view showing a process in which a controller controls the operation of a first DC calibration unit and determines a first DC calibration value according to an exemplary embodiment of the present invention.

Referring to FIG. 4, in order to remove a DC offset from a signal which is output from the IVC 215, the controller may perform a control operation so that the signal transmission device may bypass the VGA 217 and the LPF 221 in order to prevent a signal from being input/output to/from the VGA 217 and the LPF 221. Then, the controller may track the magnitude of an analog baseband input tone, which is output from the envelope detector 231, while the controller adjusts a DC calibration value of the first DC calibration unit 213 by a previously-set step value from a first default value.

When a result of the identification shows that the inflection point is not detected, the controller again may track the magnitude of an analog baseband input tone, which is output from the envelope detector 231, adjusting a DC calibration value of the first DC calibration unit 213 by the previously-set step value. In this case, an operation of tracking the magnitude of the analog baseband input tone corresponds to an operation in which the controller identifies whether a point (namely, an inflection point) is detected at which the magnitude of an analog baseband input tone which is output from the envelope detector 231 continuously decreases and again increases.

When a result of the identification shows that the inflection point is detected, the controller determines that a DC calibration value, at which the inflection point is detected, is a DC calibration value (namely, a first DC calibration value) that the first DC calibration unit 213 is to use.

In FIG. 4, a description was provided of an exemplary process in which the controller shown in FIG. 2 controls the operation of the first DC calibration unit 213 and determines the first DC calibration value. Next, an exemplary process in which the controller shown in FIG. 2 controls the operation of the third DC calibration unit 223 and determines a third DC calibration value, will be described with reference to FIG. 5.

Figure 5:
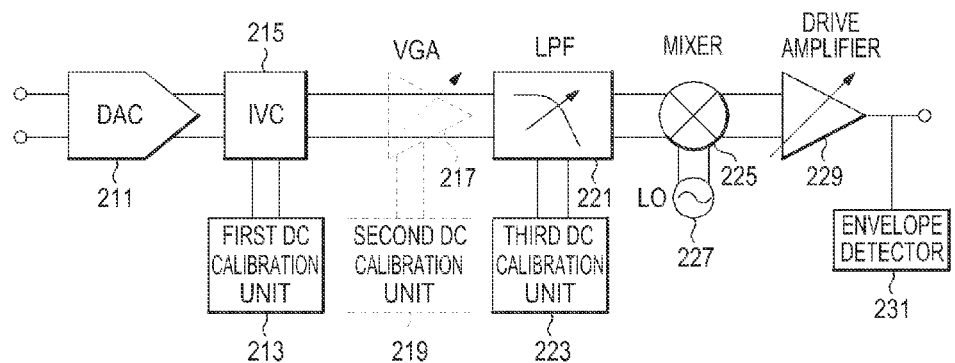
FIG. 5 is a view showing a process in which a controller controls the operation of a third DC calibration unit and determines a third DC calibration value according to an exemplary embodiment of the present invention.

FIG. 5 is a view showing a process in which a controller controls the operation of a third DC calibration unit and determines a third DC calibration value according to an exemplary embodiment of the present invention.

Referring to FIG. 5, first, it is assumed that the first DC calibration unit 213 uses the first DC calibration value determined as described above with reference to FIG. 4. In order to remove a DC offset from a signal which is output from the LPF 221, the controller may track the magnitude of an analog baseband input tone, which is output from the envelope detector 231, while the controller may adjust a DC calibration value of the third DC calibration unit 223 by a previously-set step value from a first default value, in a state of performing a control operation so that the signal transmission device may bypass the VGA 217 in order to prevent a signal from being input/output to/from the VGA 217.

When a result of the identification shows that the inflection point is not detected, the controller again may track the magnitude of an analog baseband input tone, which is output from the envelope detector 231, while the controller adjusts a DC calibration value of the third DC calibration unit 223 by the previously-set step value. In this case, an operation of tracking the magnitude of the analog baseband input tone corresponds to an operation in which the controller identifies whether a point (namely, an inflection point) is detected at which the magnitude of an analog baseband input tone which is output from the envelope detector 231 continuously decreases and again increases. When a result of the identification shows that the inflection point is detected, the controller may determine that a DC calibration value, at which the inflection point is detected, is a DC calibration value (namely, a third DC calibration value) that the third DC calibration unit 223 is to use.

Figure 6:
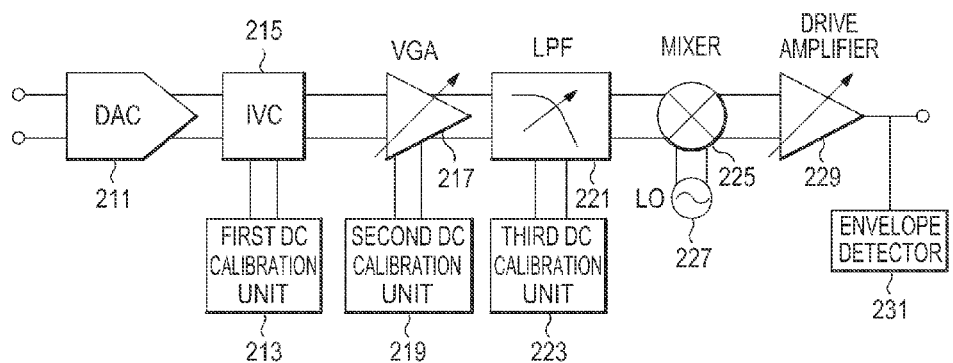
FIG. 6 is a view showing a process in which a controller controls the operation of a second DC calibration unit and determines a second DC calibration value according to an exemplary embodiment of the present invention.

FIG. 6 is a view showing a process in which a controller may control the operation of a second DC calibration unit and determine a second DC calibration value according to an exemplary embodiment of the present invention.

Referring to FIG. 6, it is assumed that the first DC calibration unit 213 uses the first DC calibration value determined as described above with reference to FIG. 4 and the third DC calibration unit 223 uses the third DC calibration value as described above with reference to FIG. 5. In order to remove a DC offset from a signal which is output from the VGA 217, the controller may track the magnitude of an analog baseband input tone, which is output from the envelope detector 231, while the controller adjusts a DC calibration value of the second DC calibration unit 219 by a previously-set step value from a first default value.

When a result of the identification shows that the inflection point is not detected, the controller again may track the magnitude of an analog baseband input tone, which is output from the envelope detector 231, while the controller adjusts a DC calibration value of the second DC calibration unit 219 by the previously-set step value. In this case, an operation of tracking the magnitude of the analog baseband input tone corresponds to an operation in which the controller identifies whether a point (namely, an inflection point) is detected at which the magnitude of an analog baseband input tone which is output from the envelope detector 231 continuously decreases and again increases. Meanwhile, when a result of the identification shows that the inflection point is detected, the controller may determine that a DC calibration value, at which the inflection point is detected, is a DC calibration value (namely, a second DC calibration value) that the second DC calibration unit 219 is to use.

Figure 7:
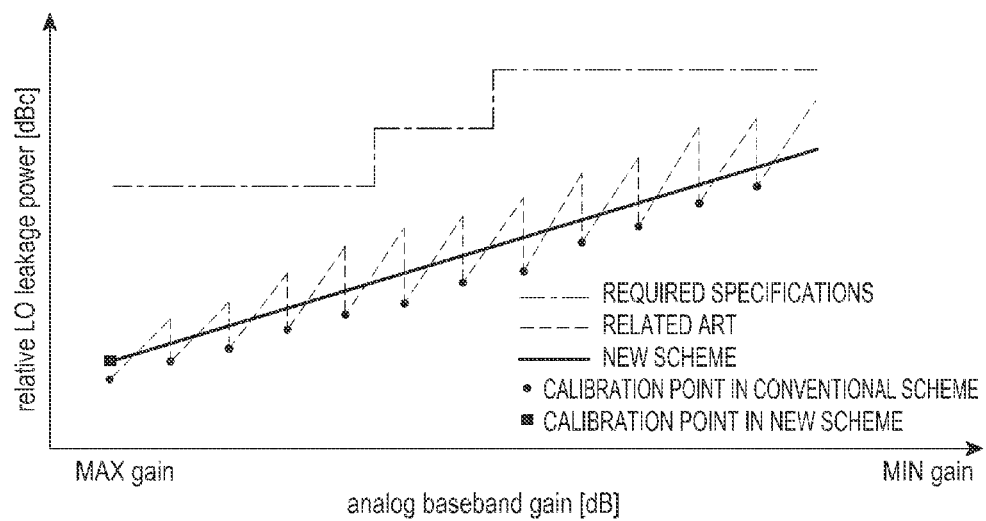
FIG. 7 is a graph showing calibration points according to a step change in an analog baseband gain in each case of an exemplary embodiment of the present invention and that of the related art.

FIG. 7 is a graph showing calibration points according to a step change in an analog baseband gain in each case of an exemplary embodiment of the present invention and that of the related art.

Referring to FIG. 7, a horizontal axis of the plotted graph represents gain [dB] in a dynamic range of an analog baseband (analog baseband gain [dB]), and a vertical axis thereof represents relative LO leakage power [dBc].

Figure 1:
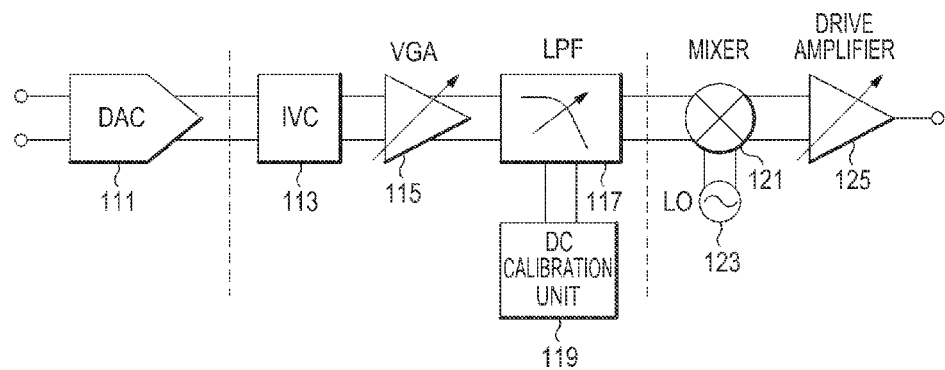
FIG. 1 is a block diagram schematically showing an internal configuration of a transmission device in a wireless communication system according to the related art.

As can be seen in the plotted graph, on the assumption that a dynamic range of an analog baseband corresponds to 30 [dB], when DC offset calibration is required, for example, at every 2 [dB], according to the scheme of the related art, the DC calibration unit shown in FIG. 1 repeats DC offset calibration 15 times in total. According to the exemplary scheme of the present invention, each DC calibration unit shown in FIG. 2 performs DC offset calibration in the case of a max gain, and thus, DC offset calibration is repeated three times in total.

Therefore, according to the scheme of the related art, in order to meet specifications required for relative LO leakage power in a dynamic range of the entire analog baseband, DC offset calibration must be repeated at multiple calibration points. In contrast, according to the exemplary scheme of the present invention, it can be noted that DC offset calibration is performed only at a calibration point matched to the max gain.

According to exemplary embodiments of the present invention, the signal transmission device performs DC offset calibration only once at a maximum gain value for each block, so that it is possible to efficiently remove a DC offset in an analog baseband.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for Direct Current (DC) offset calibration in a signal transmission device, the apparatus comprising:
   a Current-to-Voltage Converter (IVC) for converting a signal, into a voltage signal;
   a first DC calibration unit for removing a DC offset from a signal, which is output from the IVC, by using a first DC calibration value;
   a Variable Gain Amplifier (VGA) for amplifying a signal output from the IVC, by using a previously-set gain;
   a second DC calibration unit for removing a DC offset from a signal, which is output from the VGA, by using a second DC calibration value;
   a Low Pass Filter (LPF) for filtering a signal output from the VGA in such a manner as to limit a bandwidth of the signal to a previously-set bandwidth;
   a third DC calibration unit for removing a DC offset from a signal, which is output from the LPF, by using a third DC calibration value; and a controller for determining the first DC calibration value, the second DC calibration value and the third DC calibration value, wherein at least one of the first DC calibration value, the second DC calibration value, and the third DC calibration value is based on a magnitude of an analog baseband input tone.

2. The apparatus as claimed in claim 1, further comprising:
a mixer for mixing the signal, which is output from the LPF, with a signal which is output from a local oscillator;
a drive amplifier for amplifying a signal, which is output from the mixer, by a previously-set gain; and
an envelope detector for measuring the magnitude of the analog baseband input tone of a signal which is output from the drive amplifier,
wherein the controller determines the first DC calibration value by using the magnitude of the analog baseband input tone, which is output from the envelope detector, while the controller adjusts a DC calibration value, which the first DC calibration unit is to use, by a previously-set step value from a first default value, in a state of bypassing the VGA and the LPF in order to prevent a signal from being input/output to/from the VGA and the LPF.

3. The apparatus as claimed in claim 2, wherein the controller determines a DC calibration value used at an inflection point as the first DC calibration value when the magnitude of the analog baseband input tone, which is output from the envelope detector, reaches the inflection point, and the inflection point represents a point at which the magnitude of the analog baseband input tone continuously decreases and again increases.

4. The apparatus as claimed in claim 2, wherein, after the controller determines the first DC calibration value, the controller determines the third DC calibration value by using the magnitude of the analog baseband input tone, which is output from the envelope detector, while the controller adjusts a DC calibration value, which the third DC calibration unit is to use, by a previously-set step value from a first default value, in a state of bypassing the VGA in order to prevent a signal from being input/output to/from the VGA.

5. The apparatus as claimed in claim 4, wherein the controller determines a DC calibration value used at an inflection point as the third DC calibration value when the magnitude of the analog baseband input tone, which is output from the envelope detector, reaches the inflection point, and the inflection point represents a point at which the magnitude of the analog baseband input tone continuously decreases and again increases.

6. The apparatus as claimed in claim 3, wherein, after the controller determines the first DC calibration value and the second DC calibration value, the controller determines the second DC calibration value by using the magnitude of the analog baseband input tone, which is output from the envelope detector, while the controller adjusts a DC calibration value, which the second DC calibration unit is to use, by a previously-set step value from a first default value.

7. The apparatus as claimed in claim 6, wherein the controller determines a DC calibration value used at an inflection point as the second DC calibration value when the magnitude of the analog baseband input tone, which is output from the envelope detector, reaches an inflection point, and the inflection point represents a point at which the magnitude of the analog baseband input tone continuously decreases and again increases.

8. A method for Direct Current (DC) offset calibration in a signal transmission device, the method comprising:

converting a signal, into a voltage signal by a Current-to-Voltage Converter (IVC);
removing a DC offset from a signal, which is output from the IVC, by using a first DC calibration value by a first DC calibration unit;
amplifying a signal output from the IVC by using a previously-set gain by a Variable Gain Amplifier (VGA);
removing a DC offset from a signal, which is output from the VGA, by using a second DC calibration value by a second DC calibration unit;
filtering a signal output from the VGA in such a manner as to limit a bandwidth of the signal to a previously-set bandwidth, by a Low Pass Filter (LPF); and
removing a DC offset from a signal, which is output from the LPF, by using a third DC calibration value by a third DC calibration unit,
wherein at least one of the first DC calibration value, the second DC calibration value, and the third DC calibration value is based on a magnitude of an analog baseband input tone.

9. The method as claimed in claim 8, further comprising:
mixing the signal, which is output from the LPF, with a signal, which is output from a local oscillator, by a mixer;
amplifying a signal, which is output from the mixer, by a previously-set gain, by a drive amplifier; and
measuring the magnitude of the analog baseband input tone of a signal, which is output from the drive amplifier, by an envelope detector,
wherein the first DC calibration value is determined by using the magnitude of the analog baseband input tone, which is output from the envelope detector, while a DC calibration value, which the first DC calibration unit is to use, is adjusted by a previously-set step value from a first default value, in a state of bypassing the VGA and the LPF in order to prevent a signal from being input/output to/from the VGA and the LPF.

10. The method as claimed in claim 9, wherein the first DC calibration value is determined as a DC calibration value used at an inflection point when the magnitude of the analog baseband input tone, which is output from the envelope detector, reaches the inflection point, and the inflection point represents a point at which the magnitude of the analog baseband input tone continuously decreases and again increases.

11. The method as claimed in claim 9, wherein, after the first DC calibration value is determined, the third DC calibration value is determined by using the magnitude of the analog baseband input tone, which is output from the envelope detector, while a DC calibration value, which the third DC calibration unit is to use, is adjusted by a previously-set step value from a first default value, in a state of bypassing the VGA in order to prevent a signal from being input/output to/from the VGA.

12. The method as claimed in claim 11, wherein the third DC calibration value is determined as a DC calibration value used at an inflection point when the magnitude of the analog baseband input tone, which is output from the envelope detector, reaches the inflection point, and the inflection point represents a point at which the magnitude of the analog baseband input tone continuously decreases and again increases.

13. The method as claimed in claim 9, wherein, after the first DC calibration value and the second DC calibration value are determined, the second DC calibration value is determined by using the magnitude of the analog baseband input tone, which is output from the envelope detector, while a DC calibration value, which the second DC calibration unit is to use, is adjusted by a previously-set step value from a first default value.

14. The method as claimed in claim 13, wherein the second DC calibration value is determined as a DC calibration value used at an inflection point when the magnitude of the analog baseband input tone, which is output from the envelope detector, reaches an inflection point, and the inflection point represents a point at which the magnitude of the analog baseband input tone continuously decreases and again increases.

15. An apparatus for Direct Current (DC) offset calibration in a signal transmission device, the apparatus comprising:
   a Current-to-Voltage Converter (IVC) for converting a signal into a voltage signal and outputting a first signal;
   a Variable Gain Amplifier (VGA) for amplifying the first signal using a previously-set gain after a first DC offset is removed from the first signal and for outputting a second signal; and
   a Low Pass Filter (LPF) for filtering the second signal in such a manner as to limit a bandwidth of the signal to a previously-set bandwidth after a second DC offset is removed from the second signal and for outputting a third signal,
   wherein a third DC offset is removed from the third signal and,
   wherein at least one of the first DC offset, the second DC offset, and the third DC offset is based on a magnitude of an analog baseband input tone.

16. The apparatus as claimed in claim 15, further comprising:
   a controller for determining the first DC offset, the second DC offset and the third DC offset.

17. The apparatus as claimed in claim 16, further comprising:
   a mixer for, after the third DC offset is removed, mixing the third signal with a signal that is output from a local oscillator and for outputting a fourth signal;
   a drive amplifier for amplifying the fourth signal by a previously-set gain; and
   an envelope detector for measuring the magnitude of the analog baseband input tone of a signal which is output from the drive amplifier,
   wherein the controller determines the first DC offset by using the magnitude of the analog baseband input tone, which is output from the envelope detector, while the controller adjusts the first DC offset by a previously-set step value from a first default value, in a state of bypassing the VGA and the LPF in order to prevent a signal from being input/output to/from the VGA and the LPF.

18. The apparatus as claimed in claim 17, wherein the controller determines a DC offset used at an inflection point as the first DC offset when the magnitude of the analog baseband input tone, which is output from the envelope detector, reaches the inflection point, and the inflection point represents a point at which the magnitude of the analog baseband input tone continuously decreases and again increases.

* * * * *